United States Patent

Pieper

[11] 4,004,902
[45] * Jan. 25, 1977

[54] METHOD OF DYEING AND TREATING GLASS STREAMS

[75] Inventor: Helmut Pieper, Lohr (Main), Germany

[73] Assignee: Nikolaus Sorg G.m.b.H. & Co., Pflochsbach, Germany

[ * ] Notice: The portion of the term of this patent subsequent to Mar. 9, 1993, has been disclaimed.

[22] Filed: July 23, 1974

[21] Appl. No.: 491,125

[30] Foreign Application Priority Data

Jan. 25, 1974 Germany .......................... 2403476

[52] U.S. Cl. .................................. 65/134; 65/136; 65/335
[51] Int. Cl.² .......................................... C03B 5/02
[58] Field of Search ............ 65/134, 329, 136, 135, 65/335

[56] References Cited

UNITED STATES PATENTS

| 1,797,206 | 3/1931 | Howard | 65/329 X |
|---|---|---|---|
| 2,990,438 | 6/1961 | Lambert et al. | 65/135 X |
| 3,224,857 | 12/1965 | Allman et al. | 65/134 X |
| 3,236,618 | 2/1966 | Allman et al. | 65/134 X |
| 3,244,493 | 4/1966 | Cala | 65/134 X |
| 3,343,935 | 9/1967 | Keefer et al. | 65/134 X |
| 3,519,412 | 7/1970 | Olink | 65/135 X |
| 3,610,600 | 10/1971 | Schnake | 65/329 X |
| 3,850,606 | 11/1974 | Rough | 65/134 X |

Primary Examiner—S. Leon Bashore
Assistant Examiner—Frank W. Miga
Attorney, Agent, or Firm—Cushman, Darby & Cushman

[57] ABSTRACT

A method for dyeing a glass stream whereby the stream is heated electrically during upward flow, thereafter passed horizontally with a free surface formed atop the stream, adding color frits dyes or the like to the horizontal stream, mechanically agitating the stream during subsequent vertical flow and flowing the stream thereafter upwards for further treatment or processing.

2 Claims, 1 Drawing Figure

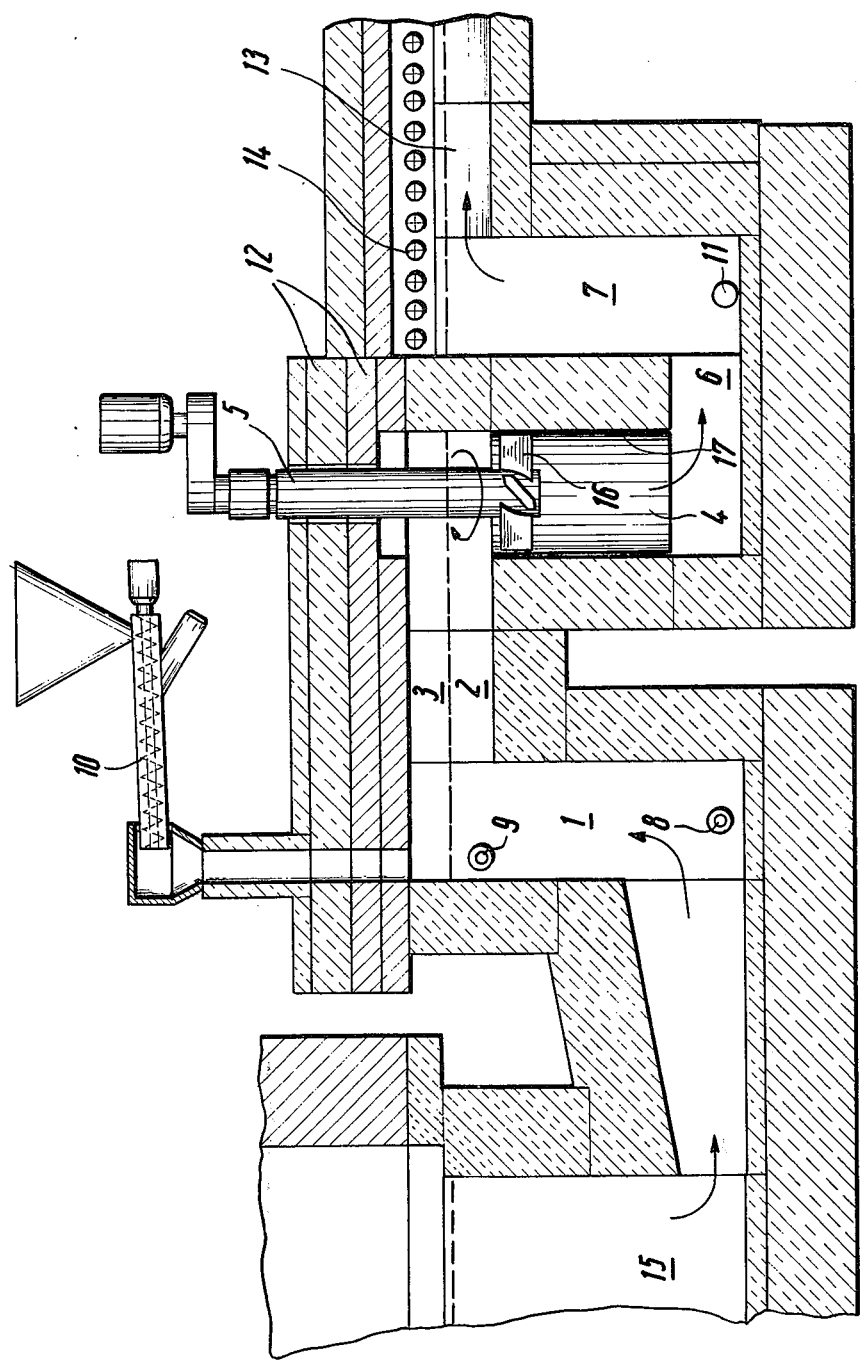

METHOD OF DYEING AND TREATING GLASS STREAMS

The present invention relates to a method of treating glass streams, especially for the dyeing and/or refining of glass in such glass streams, as well as a glass treatment cell for carrying out such method.

It is already known to color or dye glass after the melting thereof within a continous tank furnace interiorly of the feeder by means of an added dye or color frit or by means of a likewise continuously added additional melt. However, this conventional method involves substantial disadvantages because the temperature of the glass at the inlet of the feeder cannot be varied as desired since, otherwise, homogeneity of the temperature at the feeder head could not be obtained, such that drop formation cannot be achieved when the homogeneity is too low.

However, the viscosity of the glass within the available temperature range which can be handled at present, is of such high value that a problem-free dissolving of the color frit or an admixture of the color melt is extremely difficult and impossible in practical operation. In the conventional method, there are necessarily formed bubbles which can no longer escape because of the low viscosity of the molten glass, and, moreover, striation and nonuniform color distribution occur.

Furthermore, it is of disadvantage that the agressive color frit causes severe corrosion at the superstructure of the feeder by dusting due to the combustion turbulence.

It is already known to eliminate these difficulties in that the feeder channel is made substantially longer and provided with a greater number of agitators. However, due to the high viscosity of the glass within the feeder channel, and due to the fact that the direction of flow of the molten glass extends perpendicularly relative to the axis of the agitator(s) laminar flows have formed which resulted in striation particularly in the case of dark colored glasses. Frequently the homogeneity proved to be unsufficient for further processing, and the coloring showed to be non-uniform.

In comparison herewith, it is the object of the present invention to avoid all of the abovementioned disadvantages and those of the prior art and to provide means for coloring or dyeing and, furthermore, also for refining glass streams, wherein a proper and uniform dyeing can be obtained in a most simple manner, wherein an improved homogeneity of the glass flowing out from the feeder is ensured also in comparison with the glass in the melting tank, and wherein a refining and a auxiliary degassing of the glass are obtained, too.

In particular, the glass treatment cell according to the invention should be of simple construction and of small dimensions such that it is adapted to be installed into a normal feeder channel without the need of extending the latter, and such that a plurality of glass treatment cells of this kind may be attached to a glassmelting furnace tank, and the method according to the invention should lend itself to be conducted economically and with low cost investment, and such method should be useful also for glasses which are difficult to dye, such as e.g. lead glasses or dark glasses. Further prior conditions of the method according to the present invention are a trouble-free operation and the possibility of adapting the mode of operation to the conditions existing within the melting furnace tank or desired in the feeder.

According to the present invention, the above object is solved in that a glass stream is additionally heated by electric energy in a vertical upward flow, that said glass flow is thereafter passed horizontally thereby forming a free surface, and that subsequently the glass stream flows vertically downwards with mechanical agitation thereof, thereafter to flow upwards for further processing or treatment.

Preferably, the additional heating can be effected by means of Joule's heat, and in order to improve the refining action, a vacuum enhancing the refining action may be adjusted above the free surface during the horizontal flow.

For the dyeing or re-dyeing of the glass stream, the latter may have added thereto through its free surface, dyes, color frits or a prefabricated glass stream, whereby, in particular, the additions is performed at exactly the point where, due to the application of the Joule's heat, there is present a glass flow rising to a greater degree than its adjacent portions and where, at the same time, a strong swirling action within the horizontal flow is provided.

Therefore, the Joule's heat is preferably applied within a vertical plane or within a vertical flow line or path in which glass heated up to a particularly high temperature flows upwards like a spring or well.

Advantageously, the apparatus of glass treatment cell for carrying out the method according to the invention is characterized by a vertically rising glass passage having a least two electrodes for applying electrical energy, a joining horizontal glass passage including an air-gas space thereabove, and a joining, vertically descending glass passage having a circular cross-section and in which there is positioned an agitator having vanes which rotate in a horizontal plane and which extend to a point closely adjacent the passage wall and which joins to another rising glass passage, which passage permits the connection of the glass treatment cell to a feeder or the like.

The electrodes providing in the rising glass passage are disposed approximately one above the other so as to permit the abovementioned formation of the well. When the color frit is added exactly within the head of the rising glass stream, freezing of the glass by the addition of the frit is prevented and, furthermore, a strong swirling action and thus homogenization of the glass stream during its dwell within the horizontal glass passage is obtained. The color frit is fed by means of a feeding device, a screw conveyor, a vibrating chute or a similar means, and alternatively there may also be used a glass melting furnace for the continuous supply of colored glass.

In order to provide for a particular uniform mixing of the glass stream and, thus, for a homogenization of the temperature and of the dye material, the agitator device includes obliquely, positioned agitating vanes the lower edges of which are leading in the direction of rotation such that the agitation acts in opposition to the flow direction of the glass stream.

In order to drain the glass present within the treatment cell which shortens the change-over time e.g. in the case of re-dyeing, a drain opening adapted to be closed may be provided within the treatment cell in the lower portion of the rising passage or of the connecting passage between the descending and the rising passages.

Finally, in order to avoid heat losses and, thus, the generation of inhomogeneities particularly within the horizontal glass passage, there may be provided within the latter a particularly effective insulation or an auxiliary heating device including electrodes.

In the following an exemplary embodiment of the invention is described in greater detail by referring to the enclosed drawing. The FIGURE of the drawing shows a schematical sectional view of the novel treatment cell interposed between the glass melting furnace tank and the feeder.

According to FIG. 1, a dyeing-refining cell is installed in the place of the operation tank in front of the normal feeder. Due to the arrangement chosen, the total space requirement remains the same as the total space requirement in the case of a feeder in which no coloring or dyeing is to be effected.

In an alternative embodiment of the invention, the dyeing cell can also join the operation tank of a conventional continuous glass-melting furnace tank, whereas, a shown in the FIGURE the connection is made directly to the outlet of the glass melting furnace tank.

The dyeing cell or refining cell according to the invention comprises a rising glass channel or passage 1 (riser) in which a pair of electrodes 8 and 9 are positioned vertically one above the other and preferably from two sides, such that the upwardly directed streams generated at the pair of electrodes 8 and 9 add to each other as far as possible. In this manner, a strong upward flow with a well effected at the surface of the rising glass passage 1 is produced.

The rising glass passage 1 joins with a horizontal passage portion 2 in which the glass level is kept relatively low (about 15 centimeters) such that, thus, a shallow, rapidly flowing stream only can be formed. Above the glass passage 2, a free gas-air space 3 is provided which is effectively insulated or even heated, if necessary.

The horizontal glass passage 2 joins with a vertically downwardly directed duct 4 (glass passage 4) of circular cross-section in which the glass flows vertically downwards, This passage 4 has positioned therein a ceramic agitator 5 having obliquely disposed agitating vanes or blades 16 wherein the agitating vanes 16 extend up to the passage walls 17 such that, when the agitator rotates, the cross-sectional area of the duct is substantially fully covered by the vanes 16.

Thereafter, a short horizontal glass passage 6 follows which joins with a rising duct 7 opening into a conventional feeder 13.

Above the space 3, a feeding device 10 for adding color frits, dyes and the like is positioned exactly in the position where the rising glass stream is produced from below by the pair of electrodes 8 and 9.

Now, in the apparatus or glass treatment cell according to the invention the present method is carried out as follows: The glass coming from the glass-melting furnace tank 15 is brought to such a temperature by the current flowing between the electrodes 8 and 9 within the glass passage 1 that rapid melting of the color frit introduced by the metering device 10 (screw conveyor, vibrating chute, bucket wheel switch) is ensured. The frit drops onto the molten glass in the position where the combined upward flow which is particularly intense at this place due to the electrodes, effects a continuous renewal of the glass stream.

Then, the frit is carried away with the stream such that no freezing can take place at the feeding position even if the space 3 is not heated, but merely insulated by means of the insulating layers 12.

The viscosity of the molten glass is so low in the region of the horizontal passage 2, and the flow vortices are of so indistinct a nature, that the bubbles produced during the melting of the frit may easily escape, especially as the escape path of the gas bubbles up to the free surface is extremely short.

Accordingly, a maximum homogenization of the color and of the glass stream is produced already in the horizontal passage 2. Within the vertically descending glass passage 4, the ceramic agitator which is passed through the insulation layers 12 and the vanes of which sweep the full cross-sectional area of the descending duct, performs a further additional and excellent homogenization of the glass.

As the direction of rotation of the agitator 5 is chosen such that the agitator, because of the obliquely disposed vanes or agitating blades 16, conveys the mass upwards in opposition to the general flow direction of the glass stream, no stream line is unaffected, and the intermixing of the glass is complete.

Subsequently, the glass is cooled within portions 4, 6 and 7 to the temperature which is desired for the entry into the feeder. Then, the temperature can be maintained at the desired value within the feeder 13 by means of a corresponding insulation of by auxiliary heaters 14.

Due to the fact that the glass is passed at a very low viscosity from the tank to the free surface where an after-degassing is performed, the above-described treatment apparatus has the effect of a subsequently arranged refining cell which permits substantially reduction of the expense of energy within the melting furnace tank 15 itself, or which permits substantial increase in the rate of flow through said melting furnace tank 15, respectively.

The refining effect can be still further enhanced by applying a vacuum to the space 3 by means of a not illustrated pump, such that the pressure of the escaping gases is reduced to such a degree above the molten glass mass that a correspondingly rapid and complete degassing action is obtained.

Tests performed in carrying out the method of the invention and in using the refining and coloring cell according to the invention have shown that even oxidation (tempering) colors, such as a absolutely homogeneous manner. Likewise, in the same manner an opal or frosted glass can be produced which, in turn, may be colored or colorless.

The fact that only a small quantity of glass is dyed at every moment, permits to make a rapid changeover of the colors. Depending on the withdrawal rate, the color can be changed within a period of from two to four hours, and if the space 6 or 7 is provided with a drain opening 11, it is possible to vary the color of the glass within a still shorter period of time as the dyed glass can be drained completely.

The above-described apparatus is also suitable to produce dark-colored glasses, whereby, further, there exists the possibility to replace, if necessary, the metering means 10 by a small-size electric melting furnace (not illustrated) wherein the dye concentrate is continuously molten in advance.

Apparently, the refining cell according to the invention can be installed upstream of an operation tank for manual removal of the glass, too. Likewise, a plurality of dyeing cells may be arranged behind or downstream of a melting furnace tank such that several colors can be produced at various points at the same time.

As the glass passages 1, 2, 4, 6 and 7, apparently, can be constructed also with large cross-sectional areas, whereby — as found out by tests — the function of the dyeing and refining cell is not affected, the dyeing cell according to the invention can be employed in the case of large rates of flow, too.

Obviously, the method and the apparatus according to the present invention constitute the optimum solution of the existing problems in the dyeing and refining of glass streams which has been sought after for a long time.

We claim:
1. A method of treating a glass stream for dyeing and refining the glass in said stream which comprises the steps:
 a. heating the glass stream while flowing in a vertical upward flow by applying electrical energy to at least two electrodes disposed one above the other in said vertical upward flow causing a rising glass stream above said electrodes,
 b. thereafter passing the stream with a free surface horizontally while supplying dyes, color frits or a pre-dyed glass stream to said free surface of said glass stream at a point directly above said electrodes within said vertical upward flow to prevent freezing of the glass when said dyes, frits or stream are added,
 c. subsequently flowing the stream vertically downwards with mechanical agitation through a passage having a circular cross-section, the force of agitation being opposite the flow of the glass stream, and
 d. thereafter flowing the stream upwards for further processing or treatment.
2. A method according to claim 1 including the further steps of forming a free surface when streaming horizontally and adjusting a vacuum above the free surface to enhance the refining action.

* * * * *